US006135139A

United States Patent [19]

Blake, Jr.

[11] Patent Number: 6,135,139

[45] Date of Patent: Oct. 24, 2000

[54] APPARATUS FOR DRAINING HOSES

[76] Inventor: Lloyd G. Blake, Jr., 5806 Sedgefield Dr., Hanahan, S.C. 29406

[21] Appl. No.: 09/466,851

[22] Filed: Dec. 23, 1999

[51] Int. Cl.[7] .................... F16L 55/00

[52] U.S. Cl. .................... 137/355.18; 137/355.16; 137/355.26; 137/355.19

[58] Field of Search .................... 137/355.16, 355.26, 137/355.27, 355.18, 355.19

[56] References Cited

U.S. PATENT DOCUMENTS

| | | | |
|---|---|---|---|
| 210,402 | 12/1878 | Cain | 137/355.18 |
| 238,153 | 2/1881 | Piper | 137/355.26 |
| 825,570 | 7/1906 | Wirt | 137/355.18 |
| 1,322,604 | 11/1919 | Nuhring | 137/355.18 |
| 3,124,321 | 3/1964 | Rylott et al. | 242/532.6 |
| 3,774,630 | 11/1973 | Prange | 137/355.12 |
| 3,872,892 | 3/1975 | Farrington | 137/355.16 |
| 4,057,198 | 11/1977 | Whitfield . | |
| 4,265,414 | 5/1981 | Spradling | 242/532.6 |
| 5,033,690 | 7/1991 | McIver . | |
| 5,139,751 | 8/1992 | Mansfield et al. | 137/355.26 |
| 5,388,609 | 2/1995 | Ghio . | |
| 5,566,901 | 10/1996 | Wilder . | |

*Primary Examiner*—A. Michael Chambers
*Attorney, Agent, or Firm*—John F. Molay

[57] ABSTRACT

Two disks (4) attached to a cylindrical bar (3) with the cylindrical bar (3) passing through the center of the disks (4) and perpendicular to the plane of the disks (4) and also having a hollow tube (5) which surrounds the cylindrical bar (3) between the two disks (4) and which rotates freely around the cylindrical bar (3) in such a manner as to allow a flat hose to pass over the cylindrical bar (3) and facilitate the draining of the hose.

15 Claims, 2 Drawing Sheets

APPARATUS FOR DRAINING HOSES

CROSS-REFERENCE TO RELATED APPLICATIONS

Not Applicable.

STATEMENT REGARDING FEDERALLY SPONSORED RESEARCR AND DEVELOPMENT

Not Applicable

MICROFICHE INDEX

Not Applicable

BACKGROUND—FIELD OF INVENTION

This invention relates to an apparatus for draining elongated hoses prior to the hoses being hung for drying or rolled for storage. More particularly, this invention relates to an apparatus for draining hoses (e.g., fire hoses).

BACKGROUND OF INVENTION—DESCRIPTION OF PRIOR ART

Once a hose has been used to carry liquid, it must be drained prior to being coiled for storage or placed on a drying rack. This is especially true for fire hoses which must be drained of water and then placed on a drying rack prior to being coiled for storage. For the most part, the draining operation is performed manually in which the hose is laid on the ground in a straight line and then sections of the hose are successively lifted to allow the liquid to drain from one end of the hose. The process of manually lifting successive portions of the hose to cause it to drain is difficult, time-consuming, and inefficient.

Numerous devices have been proposed for winding flat hoses, however there has not heretofore been any portable device for draining flat hoses. Several devices for winding hoses have incorporated a draining device as part of the winding apparatuses. None of these draining devices were usable alone, nor were any of the draining devices portable.

U.S. Pat. No. 5,566,901 issued to Wilder discloses a method and apparatus for winding a fire hose having a reel, stand, a hand-operated crank and a static hose-engaging member, which uses gravity to drain the hose.

U.S. Pat. No. 4,057,198, issued to Whitfield discloses a firehose winding apparatus consisting of a frame on wheels, a reel; a hand-operated crank; and two idler-rollers, for guiding the hose. No draining property of the idler-rollers is claimed.

U.S. Pat. No. 3,124,321 issued to Rylott, discloses an apparatus for winding fire hoses. The apparatus consists of a reel; a hand-operated crank; and an adjustable hose guide, which includes a tubular member slidably mounted in a circular cross-sectional bar support and a radial flange. No draining property of the tubular member assembly is claimed.

U.S. Pat. No. 5,388,609, issued to Ghio, et. al, consists of a reel, a hand-operated crank, a frame on wheels, and a simple hose support bar. No draining property of the hose support bar is claimed.

U.S. Pat. No. 5,033,690, issued to McIver, consists of a frame, a hand-operated crank connected to the frame, a reel, and a U-shaped adjustable guide. No draining property of the U-shaped adjustable guide is claimed.

U.S. Pat. No. 4,265,414, issued to Spradling, discloses a collapsible, hand operated apparatus for winding fire hoses consisting of a hand crank; elongated tines for gripping the fire hose; an idler spool adapted to rotate about a horizontal axis. This arrangement compresses and drains the fire hose.

SUMMARY OF INVENTION

In accordance with the present invention an apparatus for draining hoses comprises a cylindrical rod; two disks, pressed onto the rod with the rod passing through the center of each disk; and a hollow tube, that surrounds the cylindrical rod and rotates freely around the cylindrical rod. The disks are spaced sufficiently far apart to allow a hose to be placed between them onto the hollow tube and used as a guide. The hollow tube rotates freely and allows the device to be passed under the hose to facilitate draining.

OBJECTS AND ADVANTAGES

The above-noted prior art differs from the present invention in that the present invention is small, hand-held, and easily operated. Prior inventions in this area have focused on the coiling of fire hoses, rather than the draining. This device is designed to allow hoses, such as fire hoses, to be drained quickly and efficiently by two persons placing the hose within the guides and walking along the length of the hose, rapidly and completely removing the liquid from the hose. The device is portable and small, allowing it to be stored in a truck or the trunk of an automobile and used in the field. Several of the devices may be used simultaneously on different lengths of hoses.

This summary of the invention is an overview of some of the embodiments of this invention, thus it should not be regarded as limiting the embodiments, spirit and scope of the present invention.

BRIEF DESCRIPTION OF THE SEVERAL VIEWS OF THE DRAWINGS

The accompanying drawings, which are incorporated in and constitute part of the specification, illustrate a preferred embodiment of the inventions and together with a general description given above and the detailed description given below, serve to explain the principles of the invention.

Reference Numerals for Drawings

| | |
|---|---|
| 3 Cylindrical Bar | 4 Disk |
| 5 Hollow Tube | 6 Flat Hose |

DETAILED DESCRIPTION OF INVENTION

Figure 1:
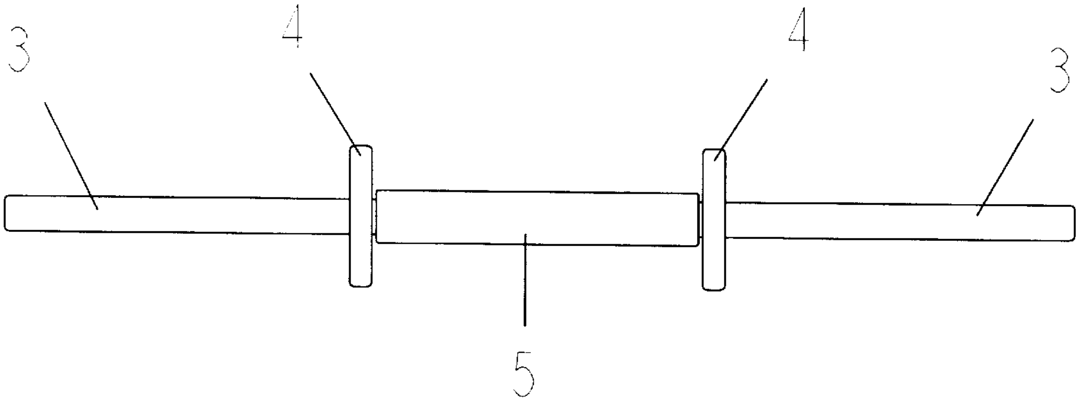
FIG. 1 shows a side view of the apparatus for draining hoses constructed in accordance with the teachings of the present invention.
Figure 2:
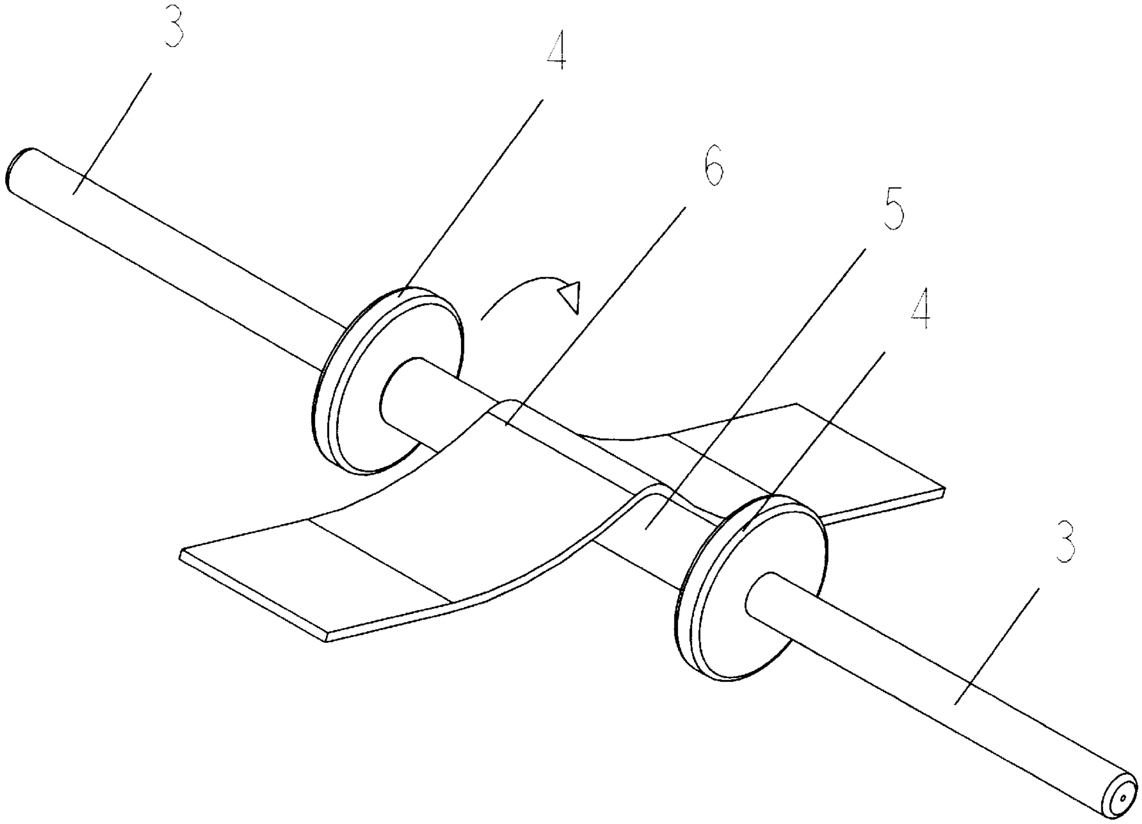
FIG. 2 is a top view of the apparatus for draining hoses, including the depiction of the placement of a section of hose, as it would be used to drain the hose.

A preferred embodiment of the present invention is illustrated in FIGS. 1 (side view) and 2 (top view). The hose draining apparatus consists of a cylindrical bar 3 of uniform cross-section. In the preferred embodiment, the cylindrical bar had a diameter of one 1 inch and a length of 30 inches. Attached to the cylindrical bar 3 are two disks 4. The cylindrical bar 3 passes through the center of the disks 4, perpendicular to the plane of the disks 4. In the preferred embodiment the disks have a diameter of 4 inches, a width of ⅝ of one inch, and are spaced 9¼ inches apart. Between the two disks 4, is a hollow tube 5, which is mounted in such a manner as to allow the cylindrical rod 3 to pass through the center of the hollow tube 5 and allow the hollow tube 5 to freely rotate around the cylindrical rod 3 when a flat hose 6 is pulled across the hollow tube 5. In the preferred embodiment, the hollow tube 5 has an outside diameter of 1½ inches, an inside diameter of 1¹⁄₁₆ inches and a length of 9 inches.

As to the manner and usage and operation of the present invention, the same should be apparent from the above description.

With respect to the above description, it is to be realized that the optimum dimensional relations for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the inventions. Further, since numerous modifications and changes will readily occur to those skilled in the art, it is not desired to limit the invention to the exact constructions and operation shown and described, and accordingly, all suitable modifications and equivalents may be resorted to, failing within the scope of the invention.

SUMMARY—RAMIFICATIONS AND SCOPE

The reader will see that the apparatus for draining flat hoses may be used to drain a flat hose, such as a fire hose, easily and conveniently. Furthermore, the invention has advantage in that:

- it permits a flat hose to be rapidly and completely drained of liquid;
- it has a minimum of moving parts to malfunction;
- it permits two users to work together; and
- it is easily stored and transported.

Although the description above contains many specificities, these should not be construed as limiting the scope of this invention or materials used in manufacturing this invention or the manufacturing process of this invention, but as merely providing illustrations of some of the presently preferred embodiments of this invention.

Thus the scope of the invention should be determined by the appended claims and their legal equivalents, rather than by the examples given.

I claim:

1. An apparatus for draining hoses comprising:

a cylindrical bar;

two disks, wherein said disks are affixed onto said cylindrical bar with said cylindrical bar passing through the center of each disk, said disks being parallel to each other and perpendicular to the cylindrical bar, and possessing means by which each disk is affixed to the cylindrical bar;

a hollow tube, wherein said cylindrical bar passes through the interior of said hollow tube whereby said hollow tube rotates around said cylindrical solid bar, said hollow tube is located between the two disks.

2. A device recited in claim 1 in which the cylindrical bar is a solid cylindrical bar.

3. A device as recited in claim 2 in which the disk is a solid disk.

4. A device as recited in claim 3 in which the disks are four inches in diameter, composed of aluminum, and spaced 9¼ inches apart; the cylindrical rod is 1 inch in diameter, 30 inches in length, and composed of stainless steel; and the hollow tube has an inside diameter of 1 ¹⁄₁₆ inches, an outside diameter of 1½ inches, a length of 9 inches, and is composed of bronze.

5. A device as recited in claim 3 in which the disks are 6 inches in diameter, composed of aluminum, and spaced 6¾ inches apart; the cylindrical rod is 1 inch in diameter, 30 inches in length, and composed of stainless steel, and the hollow tube has an inside diameter of 1¹⁄₁₆ inches, an outside diameter of 1½ inches, a length of 6½ inches, and is composed of bronze.

6. A device recited in claim 1 in which the disk is a solid disk.

7. A device as recited in claims 1, 2, 3 or 4, in which the cylindrical bar is 30 inches in length.

8. A device as recited in claims 1, 2, 6, or 3 in which the disks are four inches in diameter.

9. A device as recited in claims 1, 2, 6, or 3, in which the disks are spaced 9¼ inches apart.

10. A device as recited in claims 1, 2, 6, or 3, in which the cylindrical bar is composed of stainless steel.

11. A device as recited in claims 1, 2, 6, or 3, in which the disks are composed of aluminum.

12. A device as recited in claims 1, 2, 6, or 3, in which the hollow tube is composed of bronze.

13. A device as recited in claims 1, 2, 6, or 3, in which the hollow tube is ¼ inches less in length than the spacing between said disks.

14. A device as recited in claims 1, 2, 6, or 3, in which the interior diameter of the hollow tube is ¹⁄₁₆ inch larger than the diameter of the cylindrical rod.

15. A device as recited in claims 1, 2, 6, or 3, in which the cylindrical rod is knurled on the portions of the cylindrical rod that are not between the disks.

* * * * *